Figure 1:
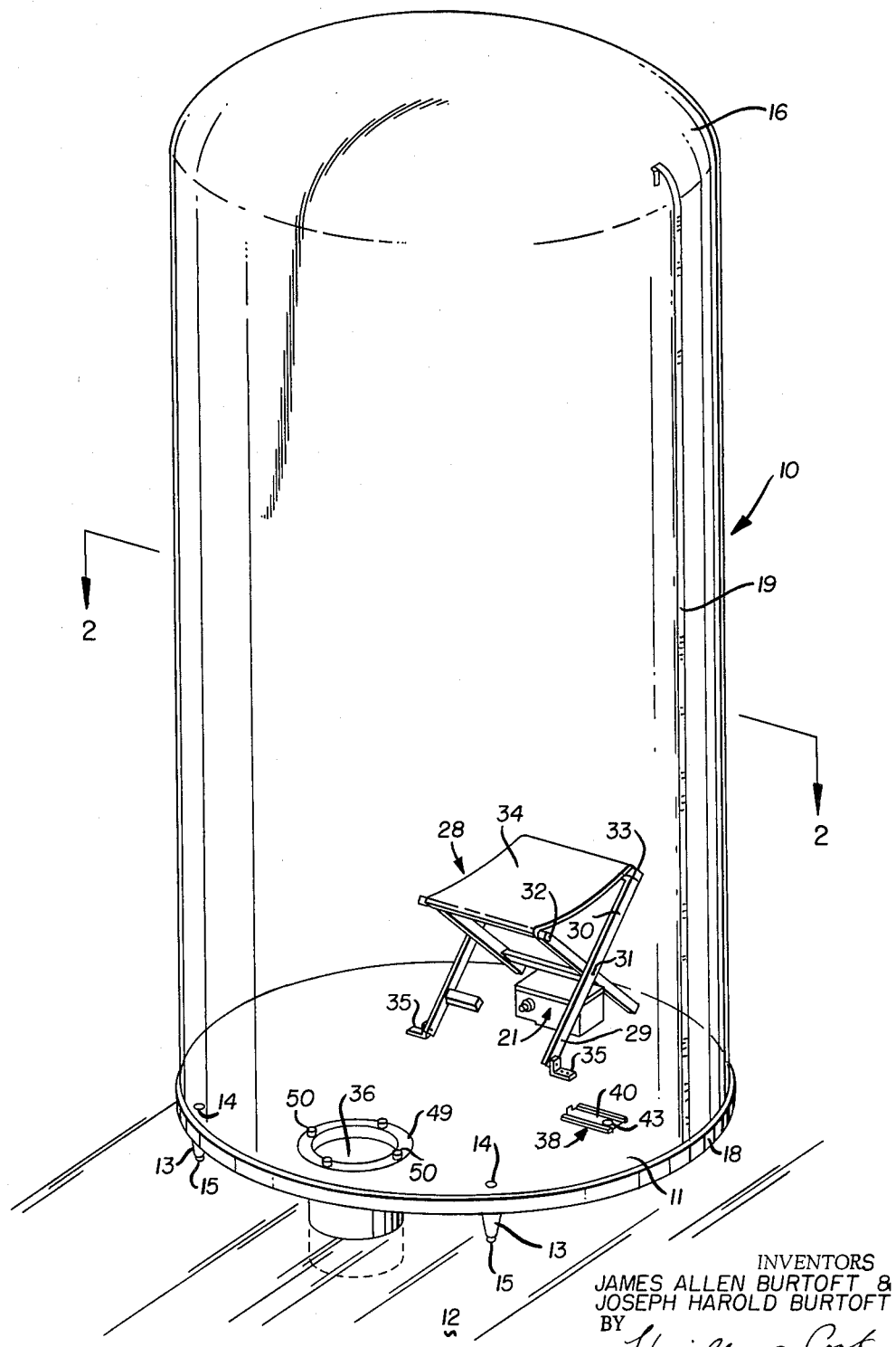

INVENTORS
JAMES ALLEN BURTOFT &
JOSEPH HAROLD BURTOFT
BY Hamilton & Cook
ATTORNEYS Dec. 21, 1965 J. A. BURTOFT ET AL 3,224,150
PORTABLE ICE FISHING SHANTY
Filed Sept. 30, 1963 2 Sheets-Sheet 2
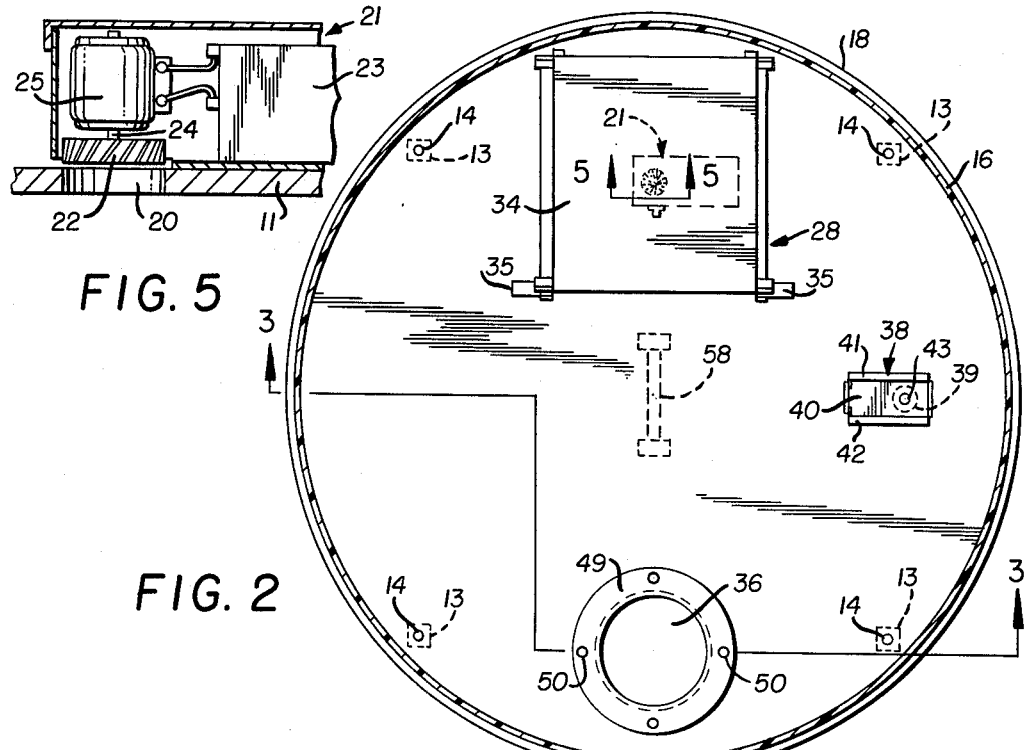
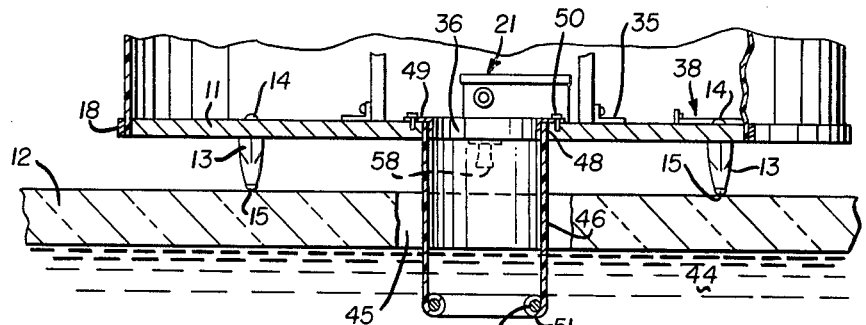
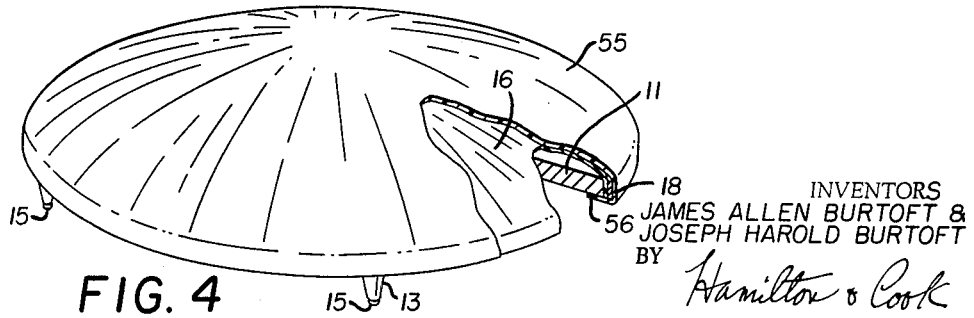
INVENTORS
JAMES ALLEN BURTOFT &
JOSEPH HAROLD BURTOFT
BY
Hamilton & Cook
ATTORNEYS

United States Patent Office 3,224,150
Patented Dec. 21, 1965

3,224,150
PORTABLE ICE FISHING SHANTY
James Allen Burtoft, 2534 Eastgate Ave., and Joseph Harold Burtoft, 3522 Albrecht Ave., both of Akron, Ohio
Filed Sept. 30, 1963, Ser. No. 312,562
4 Claims. (Cl. 52—2)

The present invention relates generally to collapsible structures. More particularly, the present invention relates to a collapsible ice fishing shanty which is also readily portable.

In those portions of the Temperate Zone where the lake surfaces freeze to a depth sufficient to support a human being, the winter season finds the angler boring holes in the ice through which he will "wet" his line. Ice fishing is enjoyed by countless numbers, and, as a result, concessionaries at many of the larger lakes provide "shanties" which can be rented and towed onto the ice to the desired location. While these shanties provide a windbreak for the fisherman, they are heavy, bulky, difficult to move and heat and often become frozen to the ice by the end of the day.

There are no known prior constructions which are readily portable by the lone fisherman and which provide the maximum of protection from the elements.

It is therefore an object of the present invention to provide an ice fishing shanty which is readily erectable, collapsible and portable by one person.

It is another object of the present invention to provide an ice fishing shanty, as above, which provides exceptional protection from the elements—including rain, snow, wind and drafts—is warmed on sunny days by solar heat and on cloudy days can be readily warmed with any of the standard sportsman's portable heating units.

It is still another object of the present invention to provide an ice fishing shanty, as above, which provides a constant replenishment of the breathing air to prevent anoxia when oxygen consuming heaters, lamps, or the like, are burning inside the shanty.

It is a further object of the present invention to provide an inflatable ice fishing shanty, in which the floor, or base member, is spaced above the ice and yet the interior of the shanty is sealed from the outside atmosphere sufficiently to permit the air exchange itself to impart the necessary structural rigidity to that portion of the shanty above the base in order to maintain the shanty in erected condition.

It is a still further object of the present invention to provide an ice fishing shanty, as above, which is economical to manufacture, operate and maintain.

These and other objects of the invention, as well as the advantages thereof over existing and prior art forms, will be apparent in view of the following detailed description and are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

In the drawings:
FIG. 1 is a perspective view of an ice fishing shanty according to the concept of the present invention which is inflated and positioned for use;
FIG. 2 is a sectional view taken substantially along line 2—2 of FIG. 1 showing the base in top plan;
FIG. 3 is a cross section taken substantially on line 3—3 of FIG. 2;
FIG. 4 is a perspective view of the shanty in deflated, portable position with the protective storage cap in position; and,
FIG. 5 is a cross section taken substantially on line 5—5 of FIG. 2.

In general, an ice fishing shanty according to the concept of the present invention has a floor which is supported in spaced relation above the ice on a plurality of feet. Sealed to the floor member is a flexible dome having a sealed entry means such as a touch closing, slide, or zipper, whereby a fisherman can get into and out of the shanty. The flexible dome is structurally supported by internal air pressure supplied by a small fan or pump means which communicates with the outside atmosphere. To effect an air exchange a restrictive vent means permits the air to escape less rapidly than it can be supplied by the pump.

A folding chair may be secured to the floor member convenient to a fishing hole through the floor member. Preparatory to using the shanty this fishing hole is positioned over the hole through the ice and a sealing sleeve which is sealed to the floor outwardly of the fishing hole is extended through the hole in the ice preferably far enough so that the other end extends into the water. This provides the necessary air seal and also provides the fisherman with the requisite access to the water.

Referring more particularly to the drawings, the novel fishing shanty is indicated generally by the numeral 10. The floor member 11 of shanty 10 is maintained in spaced relation above the ice 12 by a plurality of feet 13 secured to the floor, 11 as by screws 14. The lowermost ends of the feet 13 are preferably provided with wear resistant tips 15. While one would at first glance be inclined to think that the tips 15 should be of relatively large diameter so as not to become embedded in the ice, it is found that by so spacing the floor above the ice the heat interiorly of the shanty does not soften the ice. Moreover, the small area of the tips 15 which makes contact with the ice facilitates their removal should the surface of the ice become softened by the noonday sun and then refrozen with the feet partially embedded.

A dome 16 which is preferably a cylindrical round top element is attached to the floor member 11 as by the retaining ring 18 secured to the periphery of the floor member 11. The dome 16 is flexible so that it will collapse when the internal air pressure is released and is provided with a vertically oriented zipper 19 for opening and sealingly closing an entry means into the shanty formed by the floor member 11 and the dome 16. The dome 16 is preferably provided with a rounded top so that rain or snow will not accumulate.

The dome itself is preferably constructed of a transparent, flexible film or sheeting, for example, an extruded low or medium density polyethylene, approximately 0.010 inch thick. This material has been found to be especially strong and will withstand high winds.

The transparency affords the fisherman with unlimited vision and allows a solar heating effect by permitting the rays of the sun to penetrate.

In the embodiment shown the floor member 11 is also provided with an air inlet 20 (FIG. 5). Cooperatively positioned with respect to inlet 20 is a fan, or pump means, 21, which draws air from the surrounding atmosphere into the shanty. A fan or a pump capable of providing even a few cubic feet per minute against a back pressure of approximately one-half to one pound per square inch, can be operated for extensive periods on a six volt dry cell radio battery 23. Such a pump requires only a plurality of blades 22 mounted on a rotor 24 of a D.C. motor 25 to bring air into the shanty through inlet 20.

For convenience, a stool 28 may be attached to the floor member 11. The stool 28 may be of the standard camper's variety with opposed pairs of crossed side legs 29 and 30 pivotally connected, as at 31. An upper brace 32 extends between the upper ends of the legs 29 and a similar brace 33 extends between the upper ends of legs 30. Braces 32 and 33 support the flexible seat 34 which spans therebetween. The lowermost ends of legs 30 are each pivotally connected to an angle bracket 35 solidly secured to the floor member 11. Thus, the stool 28 may be folded flat against the floor or unfolded to accommodate the fisherman seated in front of the fishing hole 36.

Preferably within ready access of the fisherman is a vent means 38. Vent 38 comprises a vent opening 39 in the floor member 11 which is overlain by a gate 40. The gate 40 is movable with respect to the floor member 11 and may slide in a pair of opposed guide brackets 41 and 42. An opening 43 in the gate 40 is preferably of smaller area than the opening 39 in the floor member 11 so that by variably positioning the gate 40 one can diaphragmatically vary the degree by which the interior of the shanty is vented to the outside. Moreover, the gate 40 may be slid completely away from the vent opening 39 to permit the occupant to dispose of cigarette butts, or the like, therethrough.

To effect the requisite sealing of the interior of the shanty and yet permit the fisherman interiorly thereof to have the necessary access to the water 44 through the fishing hole 36 in floor 11 approximately positioned in general registry with respect to the hole 45 in the ice 12, a sealing sleeve 46 is provided. The sealing sleeve 46 is also a flexible air impervious element and is preferably constructed from the same material as the dome 16. A first open end 48 of sleeve 46 is secured to the floor member 11 outwardly of the fishing hole 36 sufficiently to permit a fish to be drawn in through the fishing hole 36 without interference. As shown, this might well mean that the first open end 48 is fastened to the periphery of the fishing hole 36 by a lipped flange 49 removably secured to the floor member 11 by a plurality of lag bolts, or the like, 50.

The other, or second, end 51 of sleeve 46 is dependingly suspended below the floor member 11 and is shaped by a former 52. The former 52 may be a ring or other relatively rigid element which maintains the lower end 51 of the sleeve 46 in a given shape so that it does not interfere with the fishing line or hinder the withdrawal of the fish therethrough. Interference by the sleeve 46 is further minimized if the length, or dimension between ends, is kept as short as possible. That is, the end 51 in which the former 52 is retained must depend sufficiently below the floor member to extend though the hole 45 in the ice and into the water 44 therebeneath, but it need not be any longer.

In order to erect the shanty the floor member is placed on the ice with the fishing hole 36 generally aligned with the hole 45 through the ice 12 so that the sleeve 46 may be inserted therein, and preferably with the wind blowing toward the side of the shanty where the zipper 19 is located. The fisherman then holds the entry means apart and if any wind is blowing it will fill the dome 16 sufficiently for the fisherman to step inside, turn on the pump 21, close the entry means and zip the zipper 19. At first it is advisable to close the vent means 38 in order to accelerate inflation of the dome 16. Thereafter, the vent should be opened in accordance with the desired heat loss and air exchange.

A similar procedure is followed for erecting the shanty when no wind is available. Under such conditions the pump 21 is turned on before the fisherman enters the shanty in order to permit partial inflation. He thereafter enters the enclosure and closes the zipped entry means.

To collapse the shanty the zipper 19 is opened, the fisherman steps out, folds the stool 28, retracts the sealing sleeve 46, turns off the pump 21 and lets the dome 16 settle into a heap on the floor member 11. A protective covering, or cap, 55 may then be fitted over the floor member 11 and an elastic retention band 56 stretched over the periphery of the floor member to engage the underside thereof. One person may then easily tilt the shanty up onto the edge of the floor member 11 and carry it by the handle 58 provided.

It should thus be apparent that a fishing shanty constructed as above described accomplishes the objects of the invention.

What is claimed is:

1. A portable shanty for accommodating at least one fisherman while fishing through a hole in the ice comprising, a floor member having an upper and an under side, foot means on the under side of said floor member to support said floor member in spaced relation above the ice, a fishing hole through said floor member, sealing means outwardly of said fishing hole dependingly secured to said floor member for extending through a hole in the ice and into the water therebelow, a flexible dome sealed to said floor member, sealable entry means in said dome, an inlet bore, a pump means attached to said portable shanty, said pump means adapted to draw outside air through said inlet bore into the interior of said shanty, a vent means for restrictive exhaust of the air in said shanty.

2. An ice fishing shanty, as defined in claim 1, in which the vent means comprises a vent opening in said floor member, a gate, an opening in said gate smaller than the vent opening in said floor member, said gate being movable with respect to said floor member to vary the opening from the interior of said shanty to the outside diaphragmatically.

3. A portable shanty for accommodating at least one fisherman while fishing through a hole in the ice comprising, a floor member having an upper and an under side, foot means on the under side of said floor member to support said floor member in spaced relation above the ice, a fishing hole through said floor member, a sealing sleeve having two ends, said sleeve being of flexible material and having one end connected to said floor member, a forming member contained in the other of said ends, said sleeve being of sufficient dimension between said ends that the end containing said former may extend through a hole in the ice into the water therebeneath, a flexible dome sealed to said floor member, sealable entry means in said dome, inflating means communicating with the outside through an inlet in said floor member for inflating said dome, and a vent means for restrictive exhaust of the air in said shanty.

4. A portable shanty for accommodating at least one fisherman while fishing through a hole in the ice comprising, a floor member having an upper and an under side, foot means on the under side of said floor member to support said floor member in spaced relation above the ice, a fishing hole through said floor member, a sealing sleeve having two ends, said sleeve being of flexible material and having one end connected to said floor member, a forming member contained in the other of said ends, said sleeve being of sufficient dimension between said ends that the end containing said former may extend through a hole in the ice into the water therebeneath, a flexible dome sealed to said floor member, sealable entry means in said dome, inflating means communicating with the outside through an inlet in said floor member for inflating said dome, a gate in said floor member, a vent opening in said floor member, an opening in said gate smaller than said vent opening, said gate being movable with respect to said floor member to vary the opening from the interior of said shanty to the outside diaphragmatically.

References Cited by the Examiner

UNITED STATES PATENTS

| | | | |
|---|---|---|---|
| 2,473,076 | 6/1949 | Scheibner | 20—2 X |
| 2,731,055 | 1/1956 | Smith | 150—52 |
| 2,959,785 | 11/1960 | Leatherman | 135—1 X |

HARRISON R. MOSELEY, *Primary Examiner.*

K. DOWNEY, *Assistant Examiner.*